United States Patent [19]

Fehrenkamp et al.

[11] Patent Number: 4,551,824
[45] Date of Patent: Nov. 5, 1985

[54] TELEMETRY SYSTEM ADAPTER

[75] Inventors: William Fehrenkamp; Arnold R. Pater; Arthur D. Brummel, all of Houston, Tex.

[73] Assignee: AMF Incorporated, White Plains, N.Y.

[21] Appl. No.: 434,300

[22] Filed: Oct. 14, 1982

[51] Int. Cl.⁴ .......................... G01V 1/16; G01V 1/22
[52] U.S. Cl. ...................................... 367/76; 367/177; 339/154 A
[58] Field of Search .................... 367/76, 177, 20, 78, 367/79; 339/154 R, 153, 154 A; 340/856, 857

[56] References Cited

U.S. PATENT DOCUMENTS 3,510,825  5/1970  Quackenbush ..................... 339/153
3,916,371 10/1975  Broding ................................ 367/78

Primary Examiner—Nelson Moskowitz
Assistant Examiner—Ian J. Lobo
Attorney, Agent, or Firm—David E. Dougherty; John H. Gallagher

[57] ABSTRACT

A telemetry system adapter for connecting a recording station to a telemetry system having a plurality of data acquisition array terminals serially connected together by cables. The adapter may be used to connect the recording station to any array terminal in the telemetry system. At the array terminal to which it is desired to connect the recording station, the cable is disconnected from the array terminal and connected to one connector of the adapter. Another connector of the adapter is connected to the array terminal, and a third connector of the adapter is connected to the recording station. The connectors on the adapter will fit only a respective one of the array terminal connectors, the cable connector or the recording station connector, and therefore cannot be attached incorrectly. The adapter may include an attenuator for balancing data levels and reducing crosstalk interference.

1 Claim, 7 Drawing Figures

TELEMETRY SYSTEM ADAPTER

BACKGROUND OF THE INVENTION

A modular telemetry cable system such as a conventional land seismic data acquisition system includes a plurality of data acquisition array terminals which are identical and serially connected together by cables to a recording station for collecting seismic data is described in copending patent applications Ser. No. 434,293, filed, 10/14/82, entitled "Telemetry System Control" by William Fehrenkamp and Ser. No. 434,292, filed 10/14/82, entitled "Telemetry System Cable" by William Fehrenkamp and Joe P. Jameson. The recording station sends commands to the array terminals for recovering geophysical data collected by the array terminals. The system is bi-directional in order to accommodate the position of the recording station relative to the array terminals.

In seismic data acquisition systems the recording station can be located at one end or the other of the system. However, in some cases, particularly where a long seismic system is in place, it is desired that the recording location be at some interior point of the system rather than at the end of the system. To insert the recording system into the middle of a seismic system requires repositioning the cable and the addition of another length of cable which is normally about 1400 feet. This requires a laborous, time-consuming, and thus expensive procedure to either connect or remove a recording station to or from an interior point of the seismic data acquisition system.

The present invention is directed to an improved telemetry system adapter or break-in adapter which need only be attached between the cable and either connector of any array terminal. With the present adapter no cable need be removed or replaced when attaching or disconnecting the recording station from the interior of a seismic data acquisition system. In addition, the adapter is constructed so that it cannot be attached incorrectly to the array terminal or the cable.

SUMMARY

The present invention is directed to a telemetry system adapter for use in connecting a recording station to a telemetry system having a plurality of data acquisition array terminals serially connected together by cables. The adapter may be connected to any point of the telemetry system to any desired array terminal. The adapter includes a plurality of connectors which cannot be attached incorrectly to the array terminal or the cable because of the polarity of the adapter connectors. Because of the adapter no cable need be removed or replaced. It is only necessary to insert the adapter between an array terminal and the cable at the location in which it is desired to connect the recording station.

Another object of the present invention is to provide a telemetry system adapter having a first connector adapted to be connected only to an array terminal, a second connector adapted to be connected only to the cable, and a third connector adapted to be connected only to the recording station. A plurality of analog transfer lines are connected between the first and second connectors for transmitting analog signals between the cable and the array terminal. A digital line is connected between each of the first and second connectors and the third connector for transmitting commands from the recording station in either direction. And a digital line is connected between each of the first and second connectors and the third connector for transmitting digital data from the array terminals to the recording station from either direction.

Still a further object of the present invention is wherein the digital line between the first connector and the third connector for transmitting data includes an attenuator for balancing data levels and reducing crosstalk interference.

Other and further objects, features and advantages will be apparent from the following description of a presently preferred embodiment of the invention, given for the purpose of disclosure and taken in conjunction with the accompanying drawings.

DESCRIPTION OF THE PREFERRED EMBODIMENT

While the telemetry system adapter of the present invention will be described in connection with its use as a seismic data acquisition system for purposes of illustration, the present adapter may be used in other applications.

Figure 1:
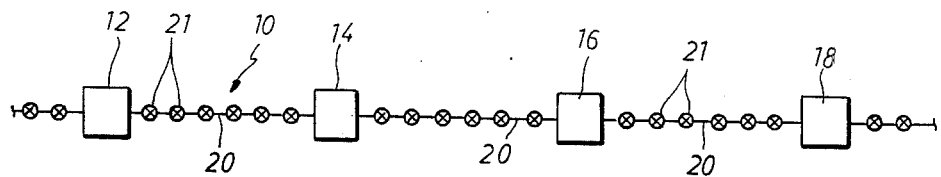
FIGS. 1 through 4 are schematic elevational views of a portion of a conventional land seismic data acquisition system showing the prior art method of connecting a recording station into the interior of the system.
Figure 2:
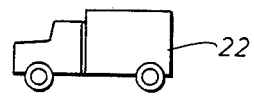
Figure 2:
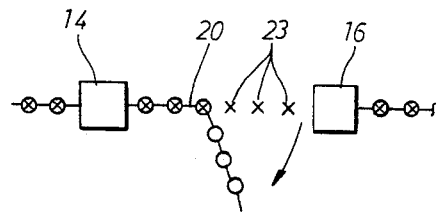
Figure 4:
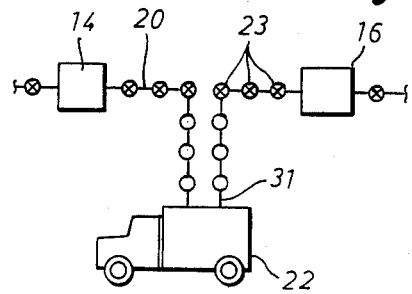
Figure 3:
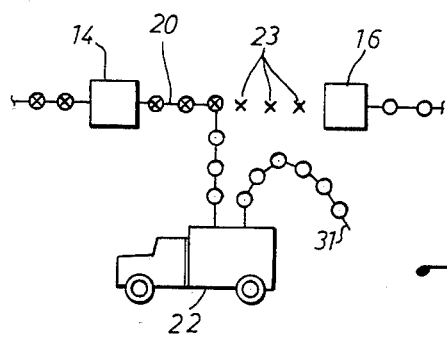

Referring now to the drawings, and particularly to FIG. 1, the reference numeral 10 generally indicates a land seismic data acquisition system including a plurality of data acquisition array terminals 12, 14, 16 and 18, as well as others not shown, serially connected together by a cable 20 which is connected to a plurality of transducers such as geophone strings 21. The array terminals are adapted to receive commands from a recording station and transmit collected data from the geophones 21 to the recording station. Generally, the recording station or recording truck 22 is positioned at one end of the system 10 or the other for sending out commands and receiving digital data from the array terminals. However, in cases where the system 10 is long, it may be desirable for various reasons to connect the recording truck 22 at some interior point in the system 10 rather than at an end of the system 10. In the prior art procedure, the recording truck 10 would be moved to the location desired, such as between array terminals 14 and 16, as shown in FIG. 1. The cable 20 between the terminals 14 and 16 would be disconnected from one of the terminals such as 16 and from three of the geophone strings 23 leaving them in place on the ground. Then as best seen in FIG. 3 a supplementary length of cable 31 is connected to the recording truck 22, and as best seen in FIG. 4, the supplemental cable 31 is connected to the three geophones 23 and to the array terminal 16. In conventional seismic work, the length of the cable 20 or 31 would be approximately 1400 feet.

Thus, from the prior art procedure illustrated in FIGS. 1–4, the procedure for inserting a recording station 22 into the interior of the seismic system 10 is laborous, time-consuming and thus costly. The procedure for disconnecting the recording station 22 from the system 10 is the reverse procedure.

Figure 5:
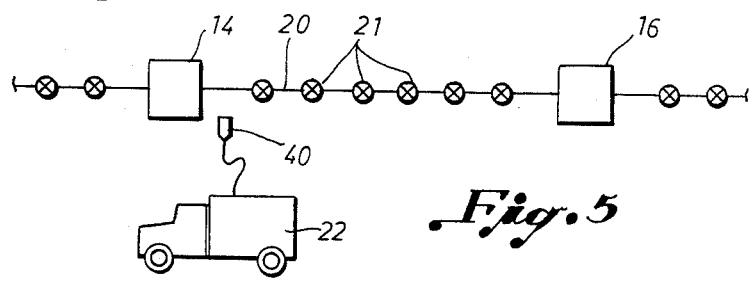
FIGS. 5 and 6 are a schematic elevational view showing the method of connecting the present invention into the interior of a seismic data acquisition system.
Figure 6:
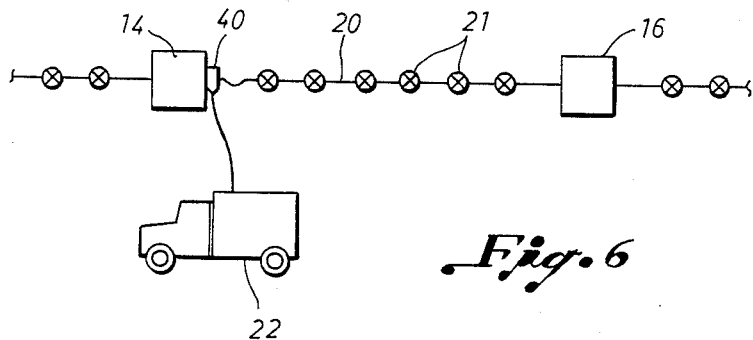

Referring now to FIGS. 5 and 6, the procedure for using the telemetry system adapter 40 of the present invention is best seen. The recording station or truck 22 is moved up to the array terminal 14 and the adapter 40 is connected to the recording station 22. Referring to FIG. 6, the end of the cable 20 adajcent the array terminal 14 is disconnected and the adapter 40 is connected with one side connected to the array terminal 14 and the other side connected to the cable 20. No additional cable 20 need be removed or added. It is only necessary to attach the adapter to one of the connectors on the array terminal 14 and to the cable 20.

Figure 7:
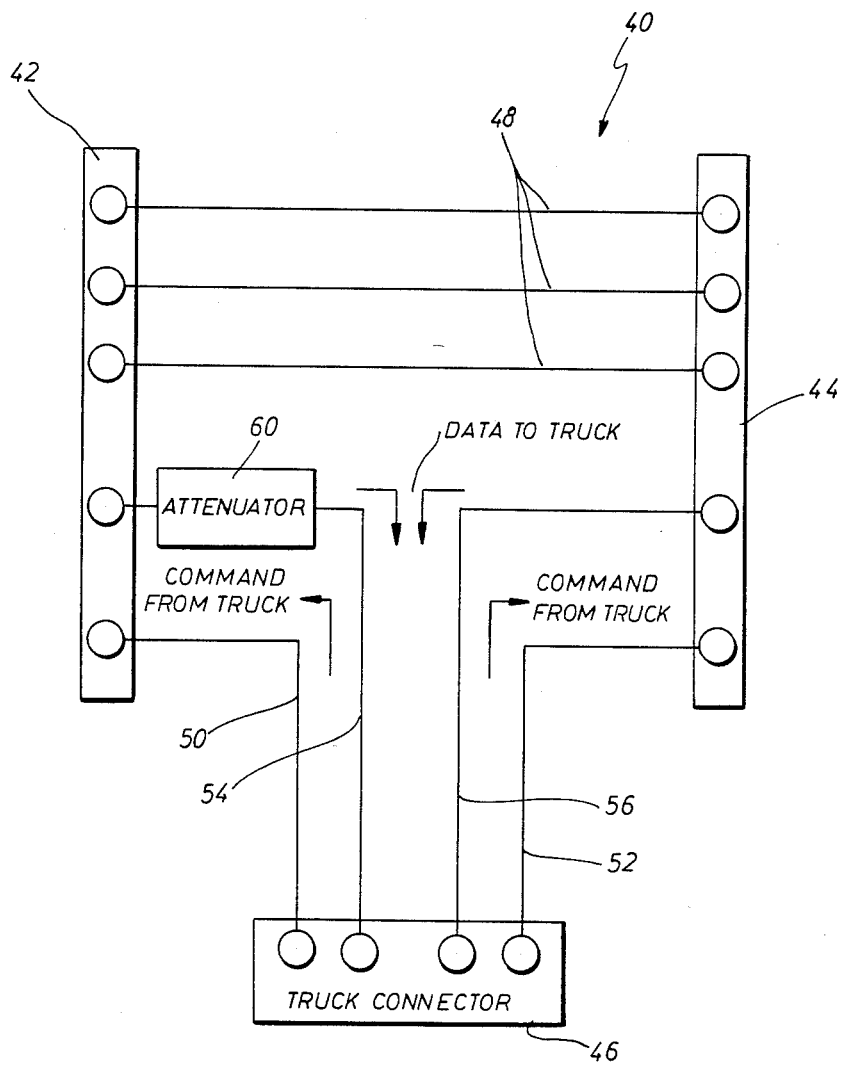
FIG. 7 is a schematic view of the telemetry system adapter of the present invention.

Referring now to FIG. 7, a schematic of the telemetry system adapter 40 of the present invention is best seen. The adapter 40 includes a first connector 42 which is adapted to be connected only to an array terminal such as having a male or female connector which will coact with a female or male connector on the mating connector of the array terminal. Similarly, a second connector 44 is provided which is adapted to be connected only to the cable 20 by having the proper polarity of the connector. And the adapter 40 includes a third connector 46 which is adapted to be connected only to the recording station 22. A plurality of analog transfer lines 48 are connected between the first connector and the second connector 44. The analog transfer lines 48 conduct the analog data acquired by the geophysical transducers 21 to the adjacent array terminal. A digital line 50 is connected between the first connector 42 and the third connector 46 and a digital line 52 is connected between the second connector 44 and the third connector 46. The digital lines 50 and 52 are for transmitting commands from the recording station 22 to the various array terminals. A digital line 54 is connected between the first connector 42 and the third connector 46 and a digital line 56 is connected between the second connector 42 and the third connector 46. The digital lines 54 and 56 are for transmitting digital data acquired by the array terminals to the recording station 22. The function of the various lines 48-56 is more fully explained in the above-mentioned copending patent applications.

As the first connector 42 will always be mated with an array terminal, it may be desirable to utilize an attenuator 60 in the digital line 54 to balance data levels and reduce cross-talk interference.

Therefore, it is noted that the adapter 40 of the present invention may be conveniently attached and disconnected from the seismic data acquisition system 10 without adding or removing lengths of cables as it is only necessary to insert the adapter 40 between the cable 20 and one of the array terminals. In addition, the adapter 40 cannot be attached incorrectly to an array terminal or cable because of the polarity of the connectors 42 and 44. In addition, the adapter 40 allows the recording station 22 to conventionally perform its function of sending various commands over the lines 50 and 52 and receiving data from the array terminals on either side of the adapter 40 through the lines 54 and 56. The analog transmission lines 48 merely provide a continuous path from the cable 20 to the attached array terminal for sending the analog signals from the adjacent geophone transducers.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. In a seismic data gathering telemetry system comprised of a plurality of identical data acquisition array terminals that are serially connected together by cables that transmit seismic data from geophones to the array terminals and then to a recording and control station, and transmit control signals from the recording and control station to said array terminals, and wherein a cable is connected intermediate its ends to one or more geophones and is connected at its respective ends to a pair of array terminals, and wherein a recording and control station conventionally is connected to one end of a cable at an end of the system, said array terminals each having at least a first type of connector adapted to mate only with a different second type of connector and each cable having at each end thereof one of said second type of connectors for mating with said first type connector on an array terminal, the improvement of a break-in adapter that permits the recording and control station to be removably connected anywhere in the seismic data gathering system between an array terminal and an end of a cable, said adapter comprising,
a second type connector for connection only to a first type connector on an array terminal,
a first type connector for connection only to a second type connector on the end of a cable,
a third connector adapted to be connected only to a recording and control station when the adaptor's first and second type connectors are connected, respectively, to a cable and to an array terminal,
a plurality of analog transmission lines connected between said first and second type connectors of the adapter for transmitting analog signals between the cable and the array terminal to which the adapter is connected,
a plurality of digital transmission lines connected between the third connector and each of said first and second type connectors of the adapter for transmitting digital signals between said recording and control station and said array terminal and said cable when the third connector of the adapter is connected to the recording and control station.

* * * * *